No. 778,137. PATENTED DEC. 20, 1904.
J. A. MARTIN.
LAMP OR STOVE FOR LIGHTING OR HEATING PURPOSES.
APPLICATION FILED FEB. 26, 1902.
NO MODEL.
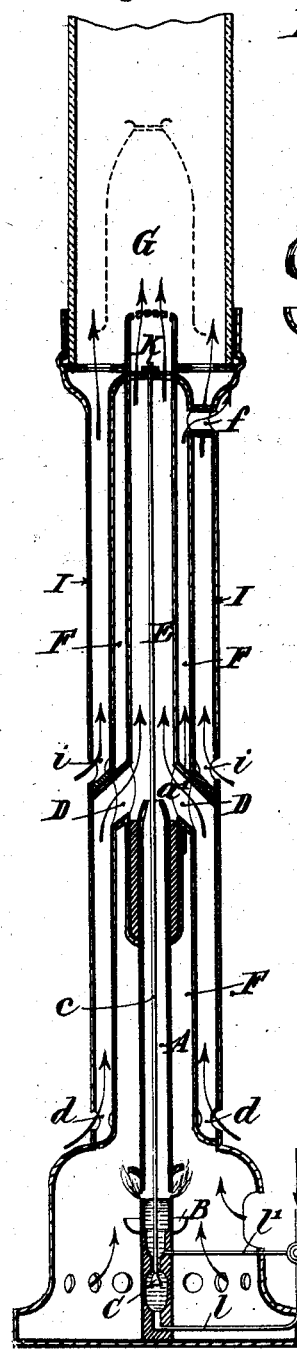
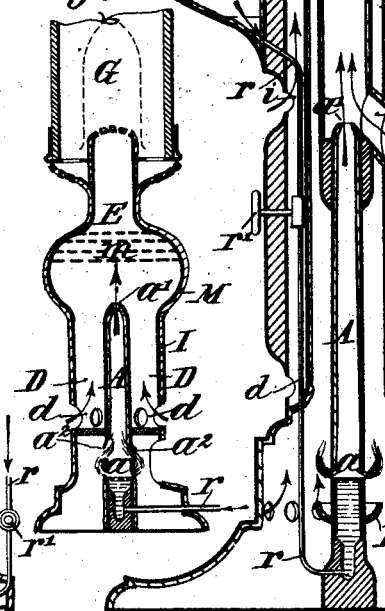
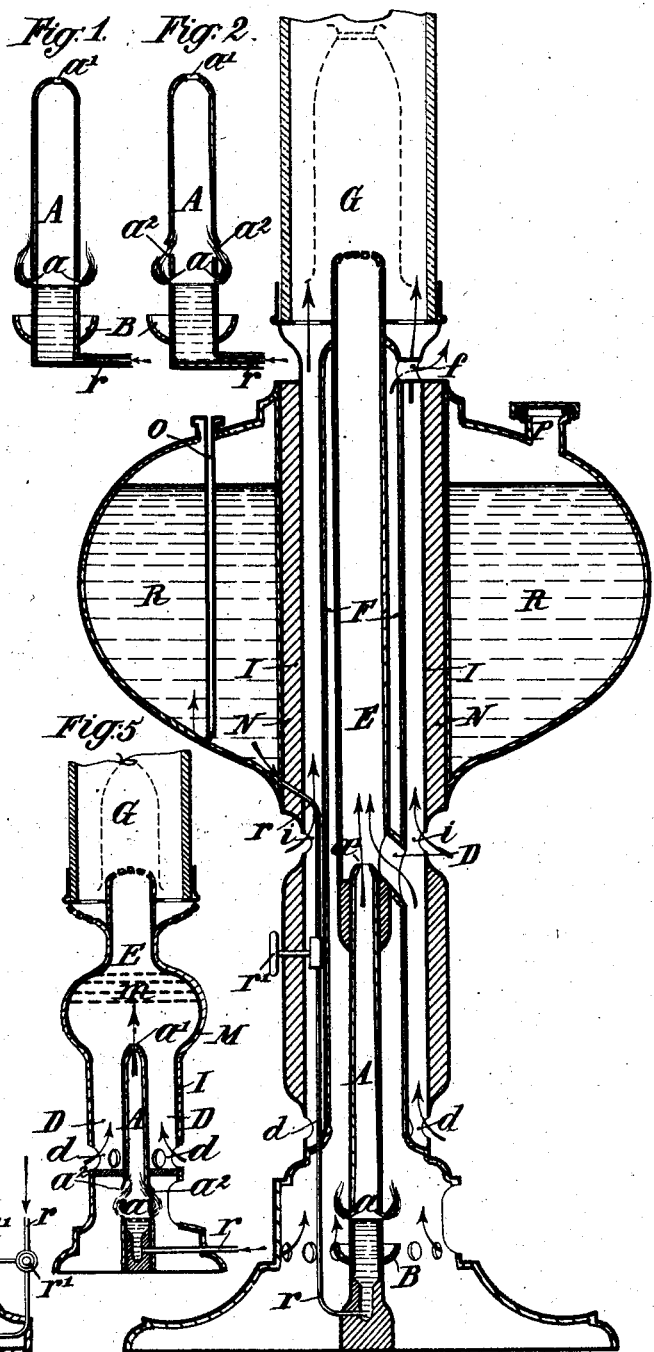
WITNESSES:
F. W. Wright,
E. W. Collins
INVENTOR
JEAN A. MARTIN
BY Howson and Howson
HIS ATTORNEYS No. 778,137. Patented December 20, 1904.

UNITED STATES PATENT OFFICE.

JEAN ALPHONSE MARTIN, OF BORDEAUX-BASTIDE, FRANCE.

LAMP OR STOVE FOR LIGHTING OR HEATING PURPOSES.

SPECIFICATION forming part of Letters Patent No. 778,137, dated December 20, 1904.

Application filed February 26, 1902. Serial No. 95,803.

*To all whom it may concern:*

Be it known that I, JEAN ALPHONSE MARTIN, chemist, a citizen of the Republic of France, residing in Bordeaux-Bastide, Gironde, France, have invented certain new and useful Improvements in Lamps or Stoves for Lighting and Heating Purposes, of which the following is a specification.

This invention relates to lamps or stoves for lighting and heating purposes of the kind in which methylated alcohol or other combustible fluid is adapted to be vaporized by the heat derived from a small portion of such fluid, whereby the alcoholic vapors are mixed with air, so as to form a readily-inflammable gaseous mixture which will serve equally for lighting and heating purposes without the use of a wick. The heat from the combustion also serves for raising the temperature of the alcoholic vapors and to heat the air mixed therewith as well as that required for the combustion of the combustible mixture. The alcohol is supplied from a reservoir, which may be integral with or otherwise fitted to the apparatus for lighting or heating, and is taken from said reservoir through a point or needle valve, capillary tube, or other device which permits of regulating the quantity of alcohol required for the proper function of the apparatus, which is based upon the following principle: The utilization for evaporating the alcohol of an auxiliary or pilot flame fed by the alcohol itself and which is spontaneously regulated whatever be the quantity of alcohol supplied to the apparatus within certain limits, which are rather extended, as has been proved by experiments, the heat from such flame being just sufficient to vaporize the alcohol on the one part and heat the temperature of the air to be mixed with the alcoholic vapors on the other part and also the air required to sustain the combustion of the said mixture. I am aware that apparatus based upon analogous principles have been patented in which alcohol or petroleum is vaporized by means of an auxiliary flame furnished in certain cases by the combustible fluid itself, but employing a wick, and in any case by means of a flame which is devoid of the properties hereinbefore stated. Thus in my system by opening the feed-tap the necessary quantity of alcohol enters the tube A in such a manner that it reaches little by little the lateral orifices $a$, through which it falls into a cup B beneath, where it is then lighted, Figure 1. The alcohol-flame extends from the cup B to the orifices $a$, and almost immediately the alcohol in the interior commences to boil and the vapors escape through the upper orifice $a'$; but as the tube A is very hot the alcohol therein diminishes rapidly, and the holes $a$ then merely burn the vapor and the flames gradually diminish in such a manner as to prevent excessive volatilization, whereupon the alcohol rises and reëstablishes the equilibrium, which it maintains. The liquid keeps up to the holes $a$, and in inspecting the flames it will be found that it is partly fed by the vapor and partly by the liquid alcohol and that it evolves just sufficient heat to maintain the ebullition. This principle may be modified in that the tube A may in addition to the holes $a$ have orifices $a^2$, so as to utilize the upper portion of the said tube as a chimney, and in this case the small flames from the holes $a$ enter the openings $a^2$ in the tube, wherein they become extinguished owing to want of air, the products of combustion from the said flames being mixed with the alcohol vapors, Fig. 2.

The orifice $a'$ for the escape of the vapors is shown contracted, so as to cause a very slight pressure to exist within the tube A. This insures small jets of vapor being forced out of the holes $a$ upon the liquid alcohol reaching a lower level than the holes.

The quantity of liquid fed to the tube A may be varied within certain limits without changing the action of the apparatus, for whatever the feed at first the liquid will be forced out of the holes $a$ and will burn, thus heating the tube to a great extent and volatilizing the liquid within the tube faster than it enters, and so causing the level to occupy a position below the holes $a$. Vapor then escapes from the holes and burning keeps up the volatilization, but to a less extent, permitting the liquid to rise again, eventually maintaining the liquid at the level of the openings and consuming the alcohol by volatilizing and burning in equal amount to the feed.

By applying this principle I have been able to construct lamps for incandescent lighting as well as heating lamps without wick, and from the foregoing statements the apparatus can burn variable quantities of alcohol with the possibility of utilizing in the case of a lamp, for example, sleeves of several sizes, although in practice for illuminating purposes the regulation of the feed is established once for all.

In order that the invention may be clearly understood, I will describe the same as applied to a lamp, with reference to the annexed drawings, in which—

Figs. 1 and 2 are diagrams embodying the principle hereinbefore described. Fig. 3 shows a vertical central section of a lamp constructed according to the present invention in which the alcohol-reservoir is independent of the lamp. Figs. 4 and 5 are vertical central sections of two modifications.

In the lamp shown in Fig. 3 the alcohol-reservoir (not shown) is connected with the supply-tube A for evaporation by means of a tube $r$, provided with a three-way cock $r'$, the object of which will be hereinafter explained. Presuming the valve C to be open, the alcohol passes through the branch $l$ into the lower portion of the tube A, in which it rises little by little and flows into the cup B through the orifices $a$. If at that moment the alcohol is lighted in the cup B, auxiliary flames will be produced from B to $a$ and the alcohol at the bottom evaporates, as before explained. The vapors issuing from $a'$ mix with the air which arrives through the tubes D. This air which enters the lamp at $d$ is heated all along its path both by radiation and conduction. The mixture of hot air and vapors rises in the tube E and finally reaches the mantle G. The gas of combustion from the auxiliary flames rises in the tube F and escapes through openings $f$. Finally the air which circulates around the mantle G and which is admitted into the lamp at $i$ is appropriately heated and passes through the intermediate space comprised between the tubes F and I. At this moment, only a few seconds after the ignition of the alcohol at B, the mantle G may be lighted and the latter almost instantly becomes incandescent. One may avoid the double ignition by the use of a self-igniter, (not shown,) which only requires the alcohol at B to be ignited.

The lamp comprises a valve in form of a cone C, carried by a rod $c$ of a metal having a greater coefficient of expansion than the other metallic parts of the lamp. The said rod is fixed near the burner with a cap by means of a bridge-piece K. The cone is pressed on its seat by the contraction of its rod. When the lamp is in operation, the said rod $c$ expands and the valve $c$ opens and permits alcohol from the chamber $l$ to ascend in the tube A. If for any reason the lamp becomes extinguished by reason of the contraction of the rod $c$, the cone C returns to its seat and almost instantly interrupts the supply of alcohol, while the tap $r'$ remains in communication with $l$. The arrangement of this safety-valve necessitates a special adaptation for lighting. It consists of a three-way cock $r'$, adapted to communicate through the branches $l$ and $l'$ with the spaces of the tube A, which are respectively above and below the valve C. The branch $l'$ being open and the branch $l$ being either open or closed the lamp may nevertheless be lighted, notwithstanding the closed position of the valve C. When the lamp has been started, only the branch $l$ is left open.

In the example Fig. 4 the reservoir R supplying the combustible is integral with the lamp. The reservoir is separated from the other metallic parts of the lamp by insulating material N and is provided with an air-inlet O, a filling-nozzle normally closed by a screw-stopper, and with a lower discharge-tap. (Not shown.)

Fig. 5 shows a diagram of a modification in which the gas of combustion is caused by an artificial draft to pass into the central tube. In this case the wall I is formed with an enlargement M, containing perforated diaphragms $m$ or any other appropriate mixing device for the gas, vapors, and air.

The lamps constructed in accordance with the principle involved in my invention give a very brilliant and very economic light irrespective with regard to whether the lamp is stationary, as in Fig. 3, or portable, as shown in Fig. 4. These lamps burn without noise and without evolving odor and do not require trimming, replacing, or regulating. Indeed, the regulation, as before stated, is effected once for all time.

It must be understood that without exceeding the limits of the present invention I reserve to myself the application of all modifications as to form, dimensions, and materials both in lamps and lamp-stoves constructed according to the principle previously stated.

I claim as my invention—

1. A burner, comprising a tube open at its upper end, and having unobstructed sides provided with holes, means for supplying hydrocarbon to the tube below the holes to cause it to flow out of the holes, where it is adapted to be burned in flames passing upwardly against its sides to heat the tube above the holes, whereby volatilized hydrocarbon will be freely expelled from the open end of said tube, in combination with a burner-tube and means for supplying air to the open end of aforesaid tube to mix with the volatilized hydrocarbon.

2. A burner, comprising a tube open at its upper end, and having its sides provided with holes, means for supplying hydrocarbon to the tube below the holes to cause it to flow out of the holes, where it is adapted to be burned to heat the tube above the holes, whereby volatilized hydrocarbon will be freely expelled from the open end of said tube, in combination with an air-mixing chamber above the open-ended tube, a chamber concentric to said tube and chamber, and a chamber communicating with the outer air, concentric to last said concentric chamber, substantially as described.

In testimony whereof I have signed my name to this specification in the presence of two subscribing witnesses.

JEAN ALPHONSE MARTIN.

Witnesses:
G. CAUS,
T. IRVING.